(12) United States Patent
Schindler et al.

(10) Patent No.: US 7,088,262 B2
(45) Date of Patent: Aug. 8, 2006

(54) METHOD OF OPERATING A DISPLAY SYSTEM IN A VEHICLE FOR FINDING A PARKING PLACE

(75) Inventors: Benno Tobias Schindler, Stolpen (DE); Tim Weis, Bensheim (DE)

(73) Assignee: Donnelly Hohe GmbH & Co. KG, Collenberg (DE)

( * ) Notice: Subject to any disclaimer, the term of this patent is extended or adjusted under 35 U.S.C. 154(b) by 15 days.

(21) Appl. No.: 10/693,390

(22) Filed: Oct. 24, 2003

(65) Prior Publication Data

US 2004/0130464 A1 Jul. 8, 2004

(30) Foreign Application Priority Data

Oct. 25, 2002 (DE) .............................. 102 50 021

(51) Int. Cl.
*G08B 1/14* (2006.01)

(52) U.S. Cl. ............ 340/932.2; 340/903; 340/436; 340/437; 340/438; 701/1; 701/41; 701/300; 701/302; 701/310

(58) Field of Classification Search ........... 340/932.2, 340/903, 436, 437, 438; 701/1, 41, 300, 701/310, 302
See application file for complete search history.

(56) References Cited

U.S. PATENT DOCUMENTS

2001/0017591 A1* 8/2001 Kuriya et al. ............ 340/932.2
2002/0005779 A1* 1/2002 Ishii et al. .................. 340/436
2002/0175832 A1* 11/2002 Mizusawa et al. ....... 340/932.2
2003/0030724 A1* 2/2003 Okamoto .................... 348/148
2003/0058338 A1* 3/2003 Kawauchi et al. .......... 348/148

FOREIGN PATENT DOCUMENTS

| DE | 197 41 896 C2 | 4/1999 |
|---|---|---|
| DE | 198 09 416 A1 | 9/1999 |
| DE | 100 65 327 A1 | 8/2001 |
| DE | 100 45 616 | 3/2002 |
| DE | 101 61 316 | 7/2002 |

* cited by examiner

*Primary Examiner*—Tai T. Nguyen
(74) *Attorney, Agent, or Firm*—McGlew & Tuttle, P.C.

(57) ABSTRACT

A method of operating a display system in a vehicle (03) for finding a suitable parking place (06) with at least one camera (01) with which an observation area in the vicinity of the vehicle (03) can be recorded, with an image processing unit in which the image data coming from a camera (03) can be processed and a display screen (02) in the interior of the vehicle on which the image data coming from the image processing unit can be displayed as an image (07). A parking place symbol (08, 18, 20) is superimposed by the image processing unit on the current image (07) on the display screen (02), symbolizing true to scale an area in the current image (07) which the vehicle (03) can reach in parking, starting from its current position, taking into account the properties of the vehicle, in particular the size of the vehicle and the maximum steering angle.

20 Claims, 8 Drawing Sheets

METHOD OF OPERATING A DISPLAY SYSTEM IN A VEHICLE FOR FINDING A PARKING PLACE

FIELD OF THE INVENTION

This invention relates to a method of operating a display system in a vehicle for finding a suitable parking place the system having a camera, an image processing unit and a display screen in the interior of the vehicle.

BACKGROUND OF THE INVENTION

Various approaches for supporting the driver of a vehicle in parking are known from the state of the art.

German Patent DE 100 45 616 A1 describes a method of operating a display system according to the preamble of Claim 1. In this method, distance sensors are additionally provided for measuring the parking place. Based on these measured data, the controller then evaluates whether the parking place is sufficient for parking the vehicle. If this is the case, a parking strategy is calculated automatically so that the vehicle can be steered into the parking place. One disadvantage of this known method is the extremely high cost of providing the required system of distance sensors which is necessary to be able to reliably measure the size of the parking place. In addition, there are a number of product liability issues with this system because if errors occur due to the measurement by the distance sensors, damage can easily occur to other vehicles or to the driver's own vehicle.

German Patent 101 61 316 A1 discloses another parking support system. With this system, the driver may select a suitable mode depending on the particular parking situation, in which case a prestored scenery is displayed on the screen, depending on the mode selected. Then the position of the driver's own vehicle relative to the prestored scenery is altered on the screen in accordance with the subsequent movements of the vehicle. However, this support system functions satisfactorily only when the actual starting position of the vehicle corresponds to the starting position of the vehicle stored temporarily in this scenery. To guarantee this, it is proposed there that suitable sensor systems be used to measure the parking place. As an alternative to that, it is proposed now that the driver be put in a position through suitable direction finding aids to bring the actual starting position into correspondence with the starting position in the scenery, which has been stored temporarily. One disadvantage of this system is that it is impossible to reliably guarantee a correspondence between the actual starting position and the starting position stored temporarily in the scenery that is actually sufficiently accurate.

SUMMARY OF THE INVENTION

Against the background of this known state of the art, the object of this invention is to propose a method which will facilitate the finding and approach to a parking place suitable for parking the vehicle by using simple technical means.

This invention is based on the fundamental finding that a vehicle can approach only certain areas starting from its current starting position at any given time and taking into account the properties of one's own vehicle, in particular the maximum steering angle and the size of the vehicle. If a vehicle is to approach a parking place, the parking place must be located in such an area relative to the starting position because otherwise an approach to the parking place from this starting position would be ruled out from the beginning. The areas a. vehicle can reach starting from its current vehicle position are determined unambiguously by the properties of the vehicle. The location of the areas relative to the vehicle and in particular relative to the mounting point of the camera on the vehicle is also determined unambiguously.

Therefore, it is proposed according to this invention that to support the driver in a search for a parking place, a parking place symbol can be superimposed on the current image on the display screen, where this parking place symbol symbolizes such an area in the current image, drawn to scale, which can be reached in parking starting from the current vehicle position. In other words, in the method according to this invention, unlike those known from the state of the art, a prestored scenery representing the environment with any parking place that might be available is not superimposed, but instead a live image of the current environment actually recorded by the camera(s) is displayed. A suitable parking place symbol is then superimposed on this live image according to this invention. This gives the driver the opportunity to place the vehicle through appropriate steering and maneuvering movements until the parking place symbol has been brought into correspondence with a parking place visible in the live image. As soon as this is the case, the driver may reliably assume that he has approached a starting position suitable for parking in this parking place and can begin the: actual parking procedure.

Essentially any form of the parking place symbol may be used for true to-scale representation of the area which can be reached in parking. According to a first embodiment, the parking place symbol is designed in the form of a rectangle, with the width of the rectangle preferably corresponding essentially to the width of the vehicle and the length of the rectangle preferably corresponding to the length of the driving path required for parking, represented true-to-scale in the image.

As an alternative to that, the parking place symbol may also be designed in the manner of two paired rectangular symbols, each having a transverse leg and a longitudinal leg, where the length of the transverse legs preferably corresponds to the width of the vehicle and the distance between the opposing transverse legs preferably corresponds to the length of road required for parking. The length of road required in parking in different parking situations depends in particular on whether maneuvering is to be performed in parking or whether no change in direction is desired. The length of road required for parking is shorter when changes in direction are performed more often in parking, but the length of road required for parking also must not fall below a certain minimum, which depends on the length of the particular vehicle. It is therefore proposed that optionally different parking place symbols be used, where the length of the rectangle or the distance between the opposing transverse legs is selected so that the length of road required for parking is symbolized with a corresponding number of changes of direction on the scale of the image display.

As an alternative or in addition it is also conceivable for the size and/or the position of the parking place symbol superimposed on the display screen to be adjustable by the driver by operation of at least one operating element. The change in size and/or position of the superimposed parking place symbol can be converted to dimensions on the scale of the environment by taking into account the scale in the diagram. As a result, there is the possibility of measuring the size and position (i.e., the distance and angle relative to one's own vehicle) of a parking place picked up by the camera and represented in the image. The size and position of the parking place symbol superimposed as a standard is known. If the driver changes the size and position of the parking place symbol until it corresponds to the size and position of a parking place picked up by the camera and represented in the image, it is possible to use the required changes in the parking place symbol for calculating the size and position of the actual parking place from these changes. No separate measurement sensors are necessary because the correspondence between the parking place symbol superimposed and the actual parking place is guaranteed by the driver.

Inasmuch as a control and/or regulating device is provided in the vehicle controller so that steering instructions, in particular steering angle settings, can be calculated automatically on the basis of the parking situations selected by the user, then the data thus obtained for describing the size and position of the actual parking place can also be taken into account in calculating the steering instructions. As a result, steering instructions coordinated with the current parking place situation can be calculated and provided to the driver without requiring any separate measurement sensors to measure the parking place situation.

To be able to represent the largest possible range of observation in the environment of the vehicle it is especially advantageous if the image data of several cameras can be combined in the image processing unit and superimposed on an image to be displayed jointly on the display screen. For example, it is conceivable for two video cameras, in particular CCD cameras, to be arranged on the trunk of the vehicle, where one camera observes the area at the center and to the left of the center and the other camera observes the area at the center and to the right of center. The image data of the two cameras may then be combined to permit a display of a single image with a correspondingly enlarged observation area.

As an alternative to this measure or in addition to it, wide-angle lenses may be provided on the cameras to enlarge the observation range. Since the wide-angle lenses cause distortion of straight lines, which makes it difficult for the driver to interpret the image displayed, a processing step may also be performed in the image processing unit so that the distortion caused by the wide angle lenses can be removed again from the images.

Interpretation of the images displayed on the display screen may be facilitated for the driver by the fact that the image data are processed in the image processing unit in such a way that the image displayed on the screen corresponds to one perspective outside the vehicle, in particular a top view from above the vehicle. Suitable methods for converting an image into a top view are known from German Patent DE 197 41 896, for example. Due to this measure, images corresponding to a fixed observation point above the vehicle are displayed for the driver on the screen. This form of display is extraordinarily counter to human power of imagination so the driver receives a good orientation aid, especially when parking in reverse.

When parking a vehicle, it is possible to differentiate among various basic parking situations. If all parking place symbols corresponding to the respective parking situations were to be superimposed on the current image at the same time, recognizability would be severely reduced. It is therefore preferable if the operator can select various prestored parking place symbols as a function of the given current parking situation, in which case then only the parking place symbol selected will be superimposed on the current image.

Conceivable parking situations for which a corresponding parking place symbol is stored include in particular parallel parking with the edge of the road on the driver's side or on the passenger's side, parking perpendicular to the edge of the road on the driver's side or the passenger's side or parking obliquely to the edge of the road on the driver's side or the passenger's side.

With the method according to this invention, the driver can position his vehicle in such a way that he can reliably drive into a parking place situated in an ambient area. In particular, he can evaluate reliably through the method according to this invention whether the size of an available parking place is sufficient for parking his own vehicle. However, this alone is often not sufficient to prevent collisions because in parking in a parking place starting from the starting position, the vehicle passes over certain areas where collision obstacles may be located. Therefore, according to a preferred embodiment, a driving movement symbol, e.g., a driving tube symbolizing the area in which there must not be any objects to collide with because this area is crossed over when parking to reach the area symbolized by the parking place symbol, is superimposed on the image. In this way, the driver is given an opportunity in a very simple manner to check on whether objects picked up by the camera in the ambient area are situated in the driving path in the planned parking operation and could thus lead to collisions.

The method according to this invention serves essentially to be able to ascertain before the start of the actual parking operation whether a parking place picked up by a camera is suitable for parking one's own vehicle and whether the current position of the vehicle is a suitable starting position for the start of the parking procedure. The functionality of the process according to this invention may also be expanded, however, with regard to the actual parking procedure. To do so, at a slanting time a vehicle position is established as the starting point and the current image at the starting time is stored temporarily. A suitable starting point for temporary storage of the current image is in particular when the driver has positioned his vehicle in such a way that the superimposed parking place symbol is made to correspond to the parking place picked up by the camera and displayed on the display screen. This image recorded by the camera is no longer updated after temporary storage but instead is displayed permanently during the movement of the vehicle in parking starting from the starting position. At the same time, the movement of the vehicle is detected with a sensor system and relayed to the image processing unit. Starting from these vehicle movement data, the image processing unit then calculates a vehicle symbol which symbolizes the current position of the vehicle in the image stored temporarily in a manner that is true to scale. Due to this variant of the method, the driver can then recognize the progress of the parking operation against the background of the image stored temporarily, which symbolizes the situation at the beginning of a parking operation.

In an expansion of this method of supporting the driver during the actual parking operation, it is also conceivable at the same time, starting from the respective parking situation after approaching a suitable starting position for driving into the parking place which has been identified as being large enough, to automatically calculate a strategy for the movement of the vehicle in parking, in particular the required steering angle settings during parking.

According to a preferred process variant, the steering instructions are calculated dynamically as a function of the respective current steering settings so that when there are deviations between the steering instructions and the steering setting, suitably corrected steering instructions are provided. In other words, this means that the computer used as the control unit continuously tracks the progress of the parking operation in comparison with the previously calculated steering instructions. In the case of deviations from the previously calculated steering instructions, then dynamically new corrected steering instructions are calculated, making it possible to reach the parking place indicated. If the deviations are too great to be able to reach the parking place indicated, it is possible to signal to the driver that the parking procedure must be repeated. These instructions for adjusting the steering while parking may be displayed visually for the driver during the actual parking procedure and/or announced acoustically and/or haptically as the set point steering angle signal. For haptic announcement of the steering angle signal, it is conceivable, for example, for the steering wheel to be made to jitter through the use of a suitable actuating element as soon as the driver deviates from the required steering angle setting in parking.

As an alternative to signaling the required steering movements; it is also conceivable for the vehicle to automatically set the required steering angle settings through suitable actuation devices for actuation of the vehicle steering.

The process according to this invention is illustrated below by the drawings as examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 4 is a view of the display screen with the camera image superimposed on it according to FIG. 2 and the parking place symbol according to FIG. 3 superimposed on that;

DESCRIPTION OF THE PREFERRED EMBODIMENTS

Figure 1:
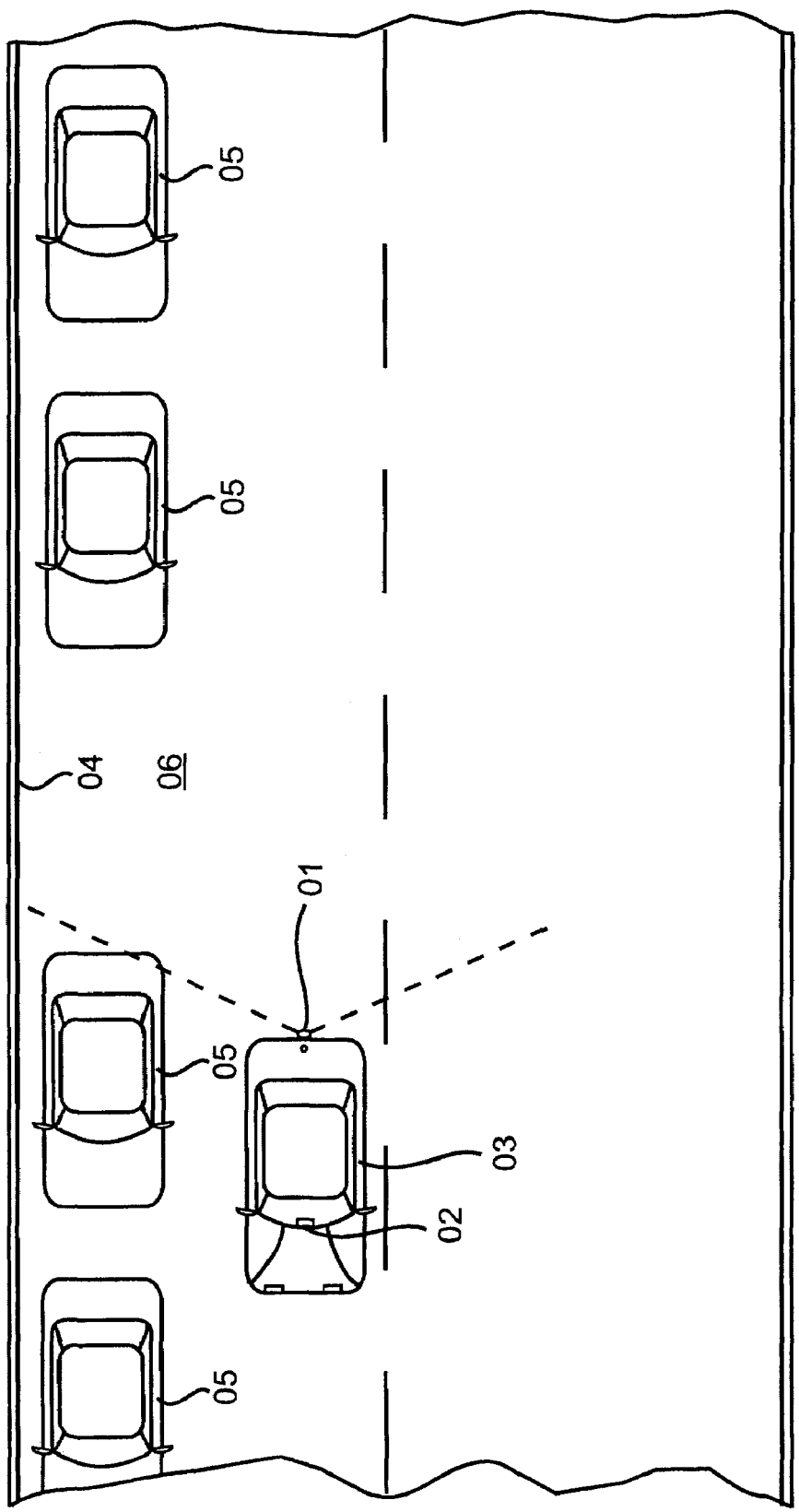
FIG. 1 is a view from above of a vehicle in a parking situation in parking parallel to the edge of the road on the passenger's side as seen from above.

Referring to the drawings in particular, FIG. 1 shows a schematic diagram of a typical parking situation. A vehicle 03 equipped with a suitable display system with a camera 01 and a display screen 02 drives past a row of vehicles 05 parking parallel to the curb 04 and is searching for a parking place 06 where the vehicle 03 can be parked. With camera 01 the ambient area behind the trunk of vehicle 03 is recorded and displayed as a live image on display screen 02. By processing the image data in an image processing unit (not shown) in the vehicle 03, the image data coining from the camera 01 are converted so that distortion caused by a wide-angle lens provided on the camera 01 is eliminated, and at the same time the display on the display screen 02 corresponds to a perspective in a an overhead view as seen from above the vehicle 03.

Figure 2:
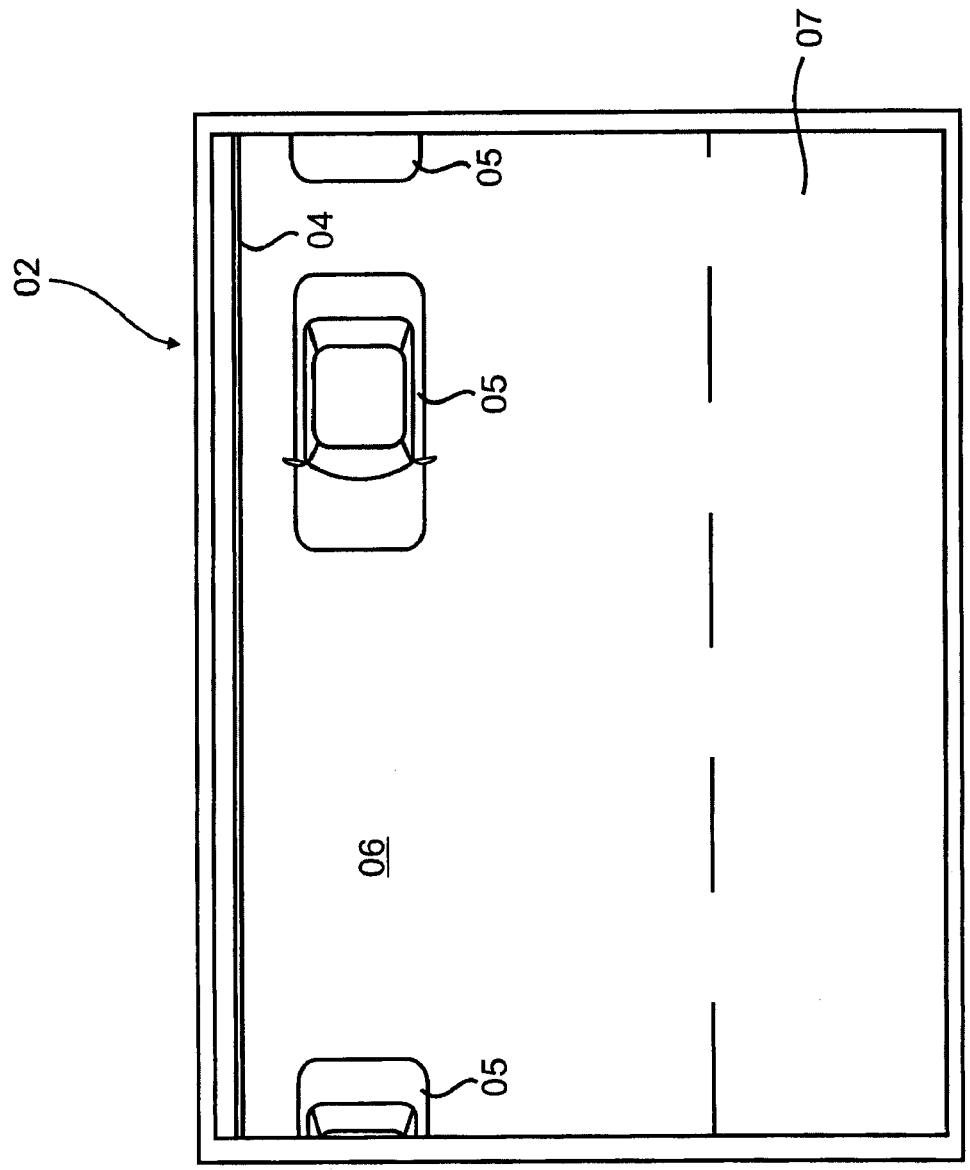
FIG. 2 is a view of the image recorded by cameras in the parking situation according to FIG. 1 and displayed on a display screen.

FIG. 2 shows the display screen 02 on which an image 07 is displayed, recorded by camera 01 at the time according to FIG. 1 and converted by the image processing unit. As a result, the live image 07 on the display screen 02 slows the driver the curb 04, the parking place 06 and the parking vehicles 05. It should be pointed out here that the diagram of the vehicles 05 in FIG. 2 is to be understood merely as a schematic indication because known processing algorithms for eliminating the distortion caused by the wide-angle lens or for displaying perspectives from outside the vehicle are not capable of representing spatially extensive objects completely without distortion. Certain residual distortion and non-displayable areas would thus remain.

If according to the diagram in FIG. 2, the parking place 06 is displayed to the driver as a simple live image, then it is difficult for the driver to estimate whether this parking place 06 is large enough for parking his vehicle 03. This is the case in particular when the parking place 06 is very narrow. In addition, the driver cannot estimate reliably on the basis of the image diagram in FIG. 2 whether his current vehicle position is a suitable starting position for starting the operation of parking in parking place 06.

Figure 3:
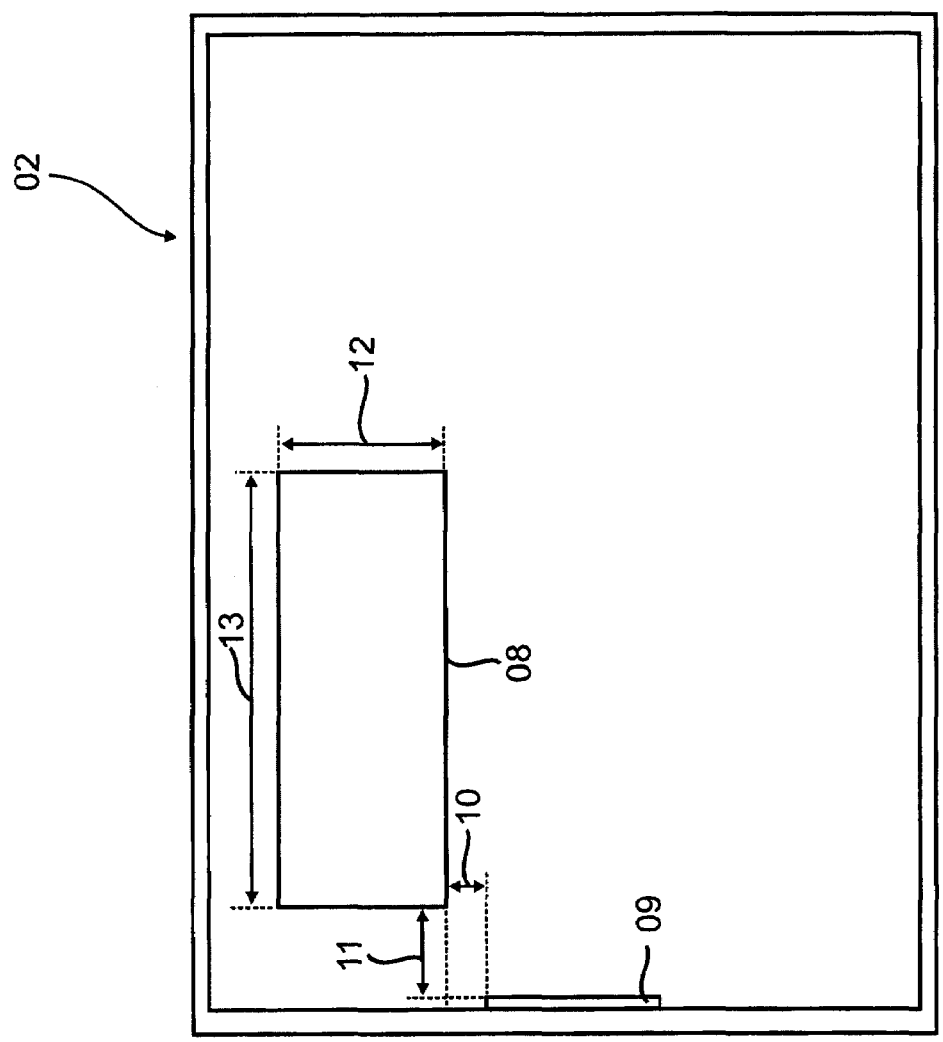
FIG. 3 is a view of the display screen according to FIG. 2 with a parking place symbol superimposed on it, suitable for the parking situation illustrated in FIG. 1.

Various parking place symbols for different parking situations are stored in the image processing unit. In FIG. 3 the display screen 02 is shown in which a parking place symbol 08 for the parking situation in parallel parking along the edge of the street on the passenger's side has been superimposed. In addition to parking place symbol 08, a symbol 09 for symbolizing the trunk of the vehicle 03 may also be superimposed on the display screen 02. The parking place symbol 08 is designed in the manner of a rectangular symbol anal defines an area which vehicle 03 can reach during its parking operation in a true-to-scale representation of the environment behind the trunk of his vehicle. The distances 10 and 11 between the right rear corner of vehicle 03, which is symbolized by symbol 09 on the display screen 02, and the left front corner of the parking place symbol 08 depend essentially on the maximum possible steering angle of the vehicle 03. The width 12 of the parking place symbol corresponds essentially to the width of the vehicle 03 on the s scale of the diagram on the display screen 02. The length 13 of the parking place symbol 08 corresponds to the required length of road which is required in parking the vehicle 03 without changing direction on the scale of the diagram on the display screen 02.

Figure 4:
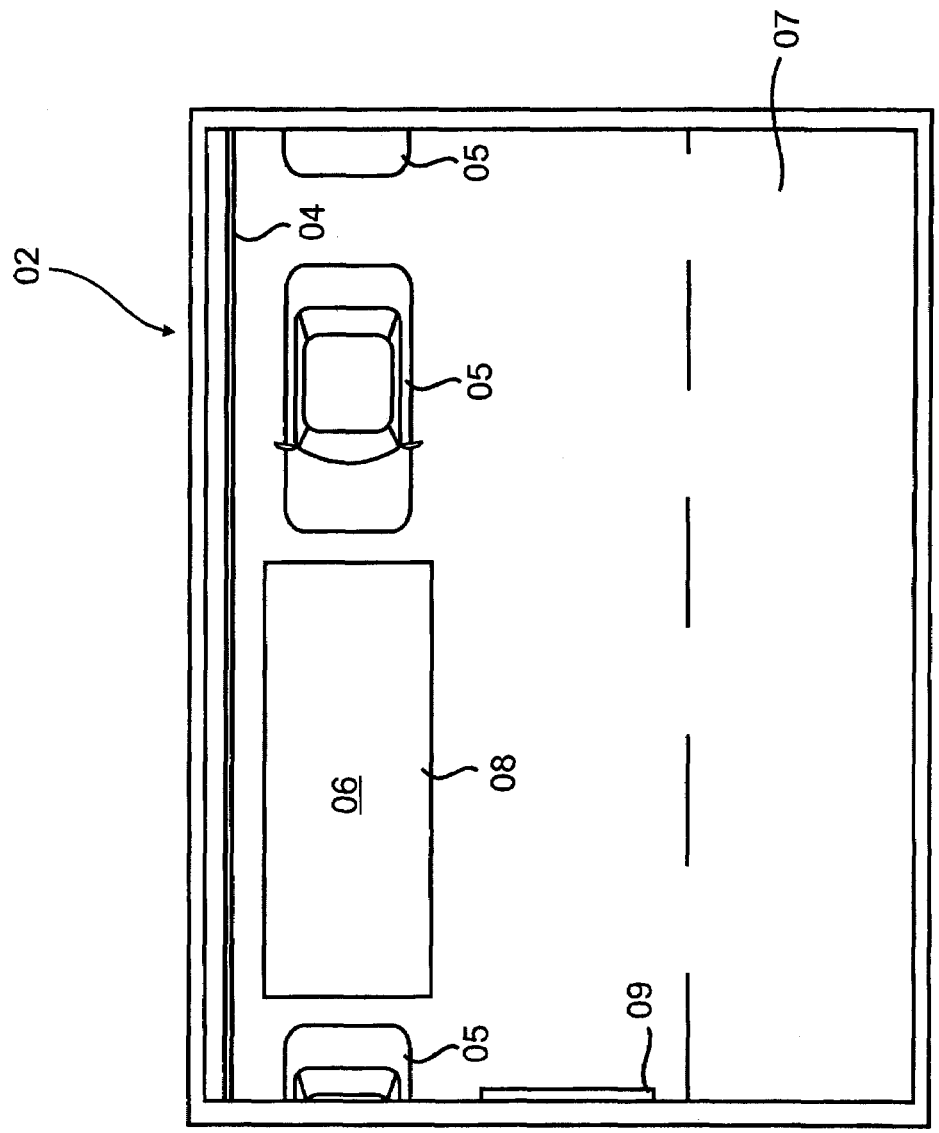

FIG. 4 shows the display screen 02 where according to this invention the parking place symbol 08 has been superimposed on the live image 07 recorded by the camera 01. Through suitable driving movements, the vehicle has been brought into a position in which the parking place 06, which is displayed on the display screen 02 and is available, is brought into complete correspondence with the superimposed parking place symbol 08. The driver can read directly from this representation the fact that the parking place 06 is large enough to park his vehicle 03 and furthermore the current position of his vehicle 03 is a starting position suitable for approaching the parking place 06.

Figure 5:
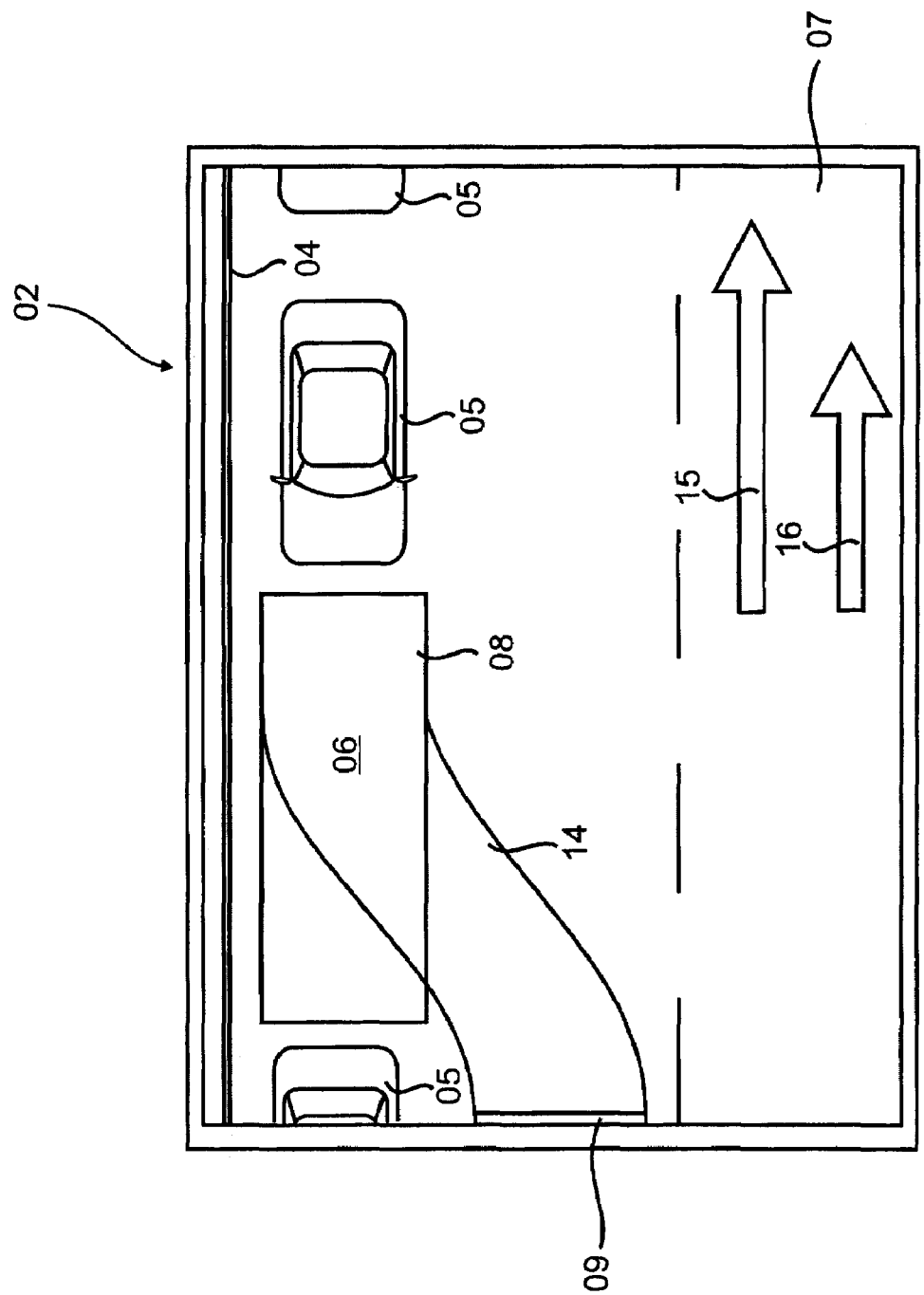
FIG. 5 is a view of the display screen according to FIG. 4 with a driving movement symbol additionally superimposed and symbols additionally superimposed for the set point steering angle and the actual steering angle at the start of the parking operation.

FIG. 5 shows the display screen 02 with the image 07 according to FIG. 4. After the driver has found a suitable starting position for approaching parking place 06 which has been found to be large enough, a driving movement symbol 14, namely a driving tube, may additionally be superimposed on display screen 02. This driving movement symbol in the diagram on display screen 02 symbolizes true to scale the area behind the trunk of vehicle 03 which is traversed by vehicle 03 in parking in parking place 06 starting from its starting position. Thus the driver has a simple means for checking on whether this area is free of objects with which he could collide and which could cause a collision with vehicle 03 in parking.

In addition, a set point steering angle symbol 15 which signals visually to the driver the steering angle which he must set in the starting position in order to initiate the parking operation is also superimposed on the image 07 according to FIG. 5. It can be seen here that the driver must turn the steering wheel sharply to the right in order to be able to approach the parking place 06 which is located at the right on the passenger's side parallel to the edge of the road when backing into the parking place. Beneath the set point steering angle symbol 15, an actual steering angle symbol 16 symbolizing the current steering angle of the vehicle 03 and based on the data determined by the sensor system has also been, superimposed on the display screen 02. By comparing the set point steering angle symbol 15 and the actual steering angle symbol 16, it is easily possible for the driver to monitor whether the steering angle setting he has actually set is suitable to drive the vehicle 03 into the parking place 06 which is to be approached. As shown in FIG. 5, the actual steering angle is too small, so the driver must still turn the steering wheel more to the right before driving further.

If the driver has reached the starting position suitable for approaching the desired parking place 06 as illustrated in FIG. 5 for example, the actual parking operation may begin. At the start of the actual parking operation, the driver may have the image 07 which is displayed on the display screen 02 at this time stored temporarily by operating an operating element such as a pushbutton and then he may have the temporarily stored image 07a displayed permanently on the display screen 02. In other words, in this case the screen display on display screen 02 is no longer updated with live images from the cameras but instead it always corresponds to the representation of the image at the beginning of the parking operation as illustrated in FIG. 5 for example.

Figure 6:
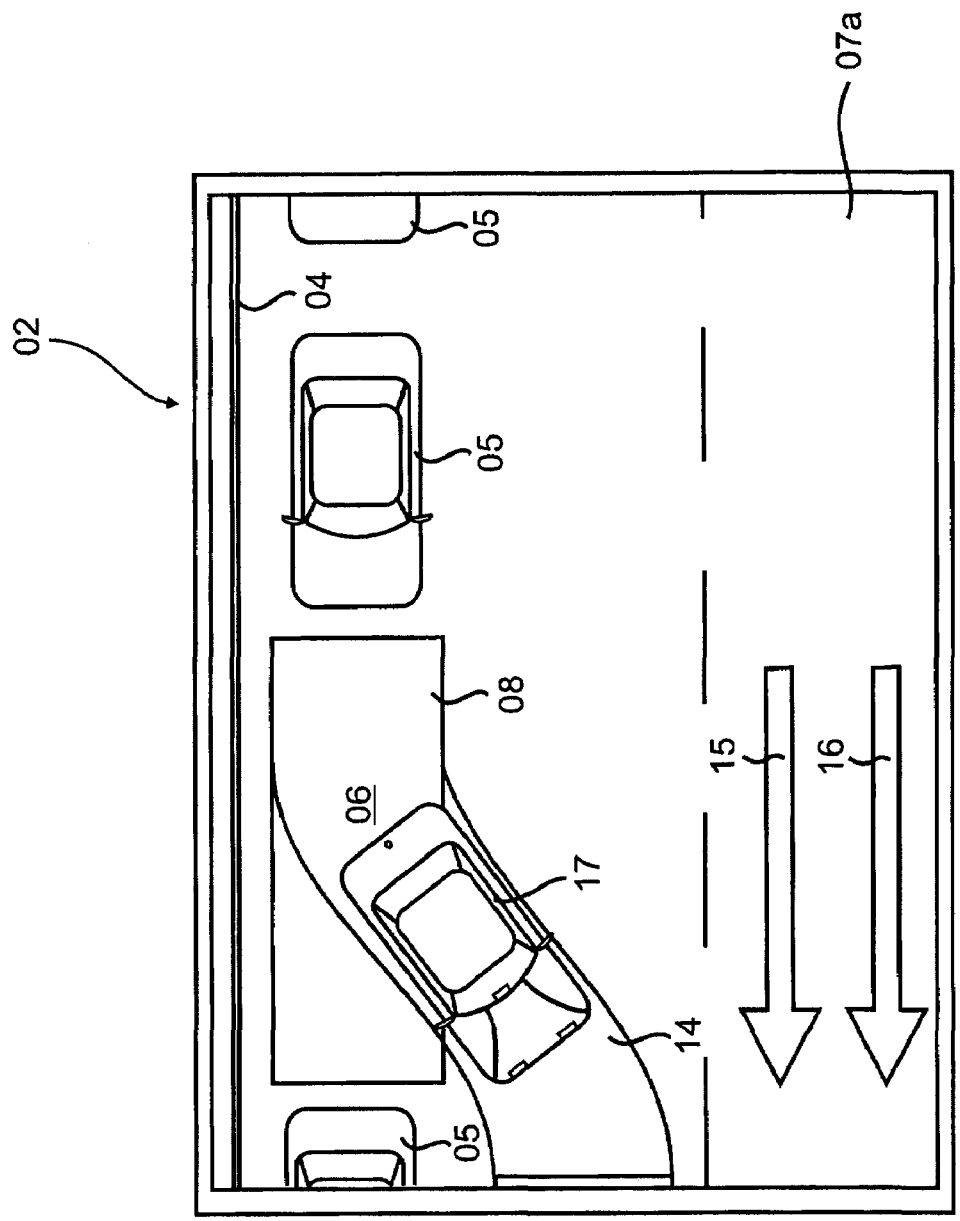
FIG. 6 is a view of the display screen with the temporarily stored image according to FIG. 5 with a vehicle symbol and symbols for the set point steering angle and the actual steering angle in the vehicle position illustrated additionally superimposed on the image.

As illustrated in FIG. 6 for example, a vehicle symbol 17 may now be superimposed on this temporarily stored image 07a, the size of the vehicle symbol corresponding to the true-to-scale diagram of the vehicle 03 in the image representation on the display screen 02. By means of the sensor system provided on the vehicle, the movement of the vehicle relative to the starting position is detected during the parking operation and these data are sent to the image processing unit. The image processing unit then calculates from these data the position of the vehicle symbol 17 in the temporarily stored image 07a and inserts the vehicle symbol 17 in the proper position. As a result, the display on display screen 02 according to FIG. 6 is not a live image but instead is a temporarily stored image 07a, which corresponds to the starting situation at the beginning of the parking operation, whereby the position of the vehicle symbol 17 is superimposed on this temporarily stored image 07a starting from the vehicle movement data detected by the sensor system. As a result of this procedure the driver has an opportunity to observe the progress of his own parking operation in an overview, although his vehicle is actually moving relative to the environment. The driver should preferably have the option of being able to switch at any time to a representation with live images from camera 01 so that the driver can monitor whether the situation in the environment has changed in comparison with the initial situation.

Figure 7:
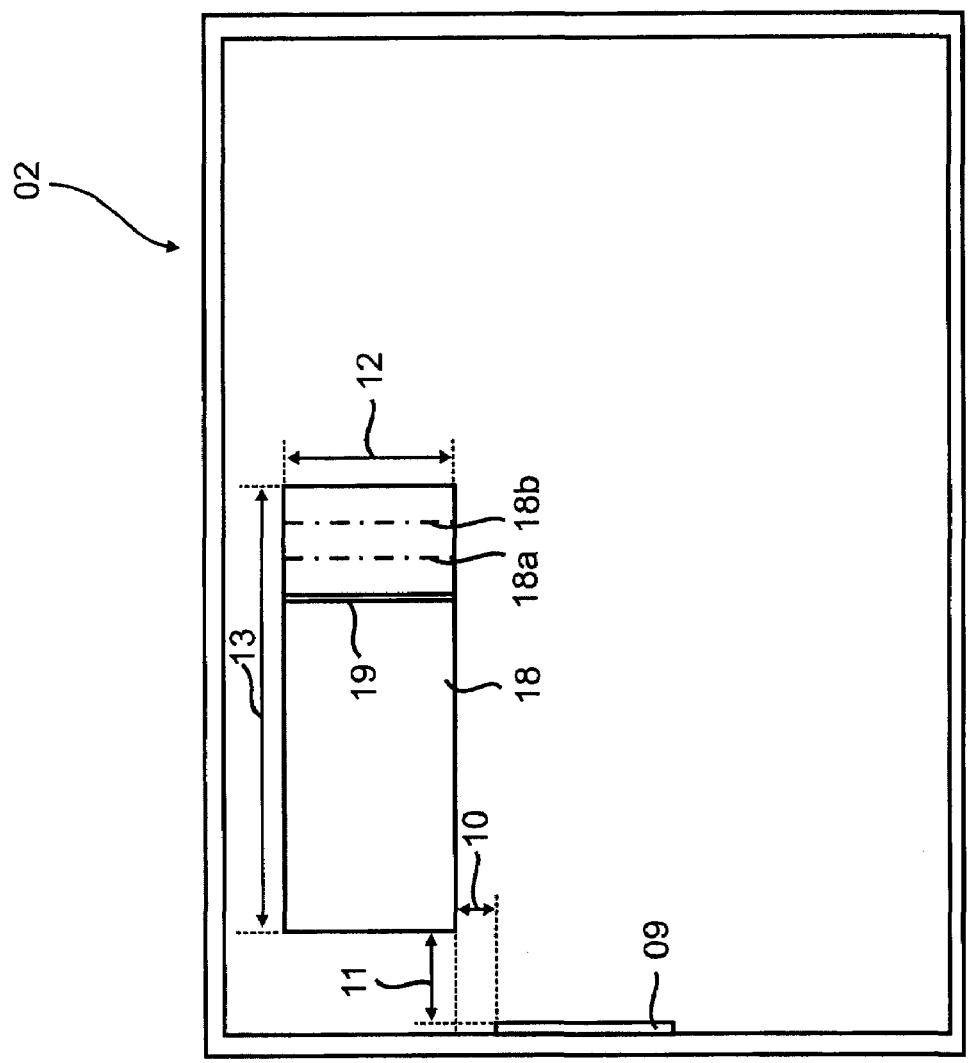
FIG. 7 is a view of a second embodiment of a parking place symbol.

In addition to the vehicle symbol 17, at the same time the respective current set point steering angle symbol 15 and the respective current actual steering angle symbol 16 are also superimposed on the temporarily stored image 07a according to FIG. 6 in order to provide the driver assistance in adjusting the steering angle during the parking operation. It can be seen here that the driver must turn the steering wheel sharply to the left according to the driving situation illustrated in FIG. 6, which has already taken place suitably accordingly because the length of the actual steering angle symbol 16 corresponds to the length of the set point steering angle symbol FIG. 7 shows a second embodiment 18 of a parking place symbol superimposed on the display screen 02. The outer border of the parking place symbol 18 corresponds to the outer border of the parking place symbol 08 with the same distances 10 and 11 from the right corner of the symbol for the vehicle trunk 09 and the same width 12 and the same width 13. In addition, the auxiliary lines 18a, 18b and 19 are also superimposed on display screen 02 in addition to the parking place symbol 18. The auxiliary line 18a symbolizes the required length of road which is necessary in parking with two changes of direction, i.e., with an intermediate movement forward. Auxiliary line 18b symbolizes the required length of road necessary with four changes of direction, i.e., with two intermediate forward movements. Auxiliary line 19 symbolizes the required length of the road as the absolute minimum even with multiple changes of direction because parking in a smaller parking place is impossible.

Figure 8:
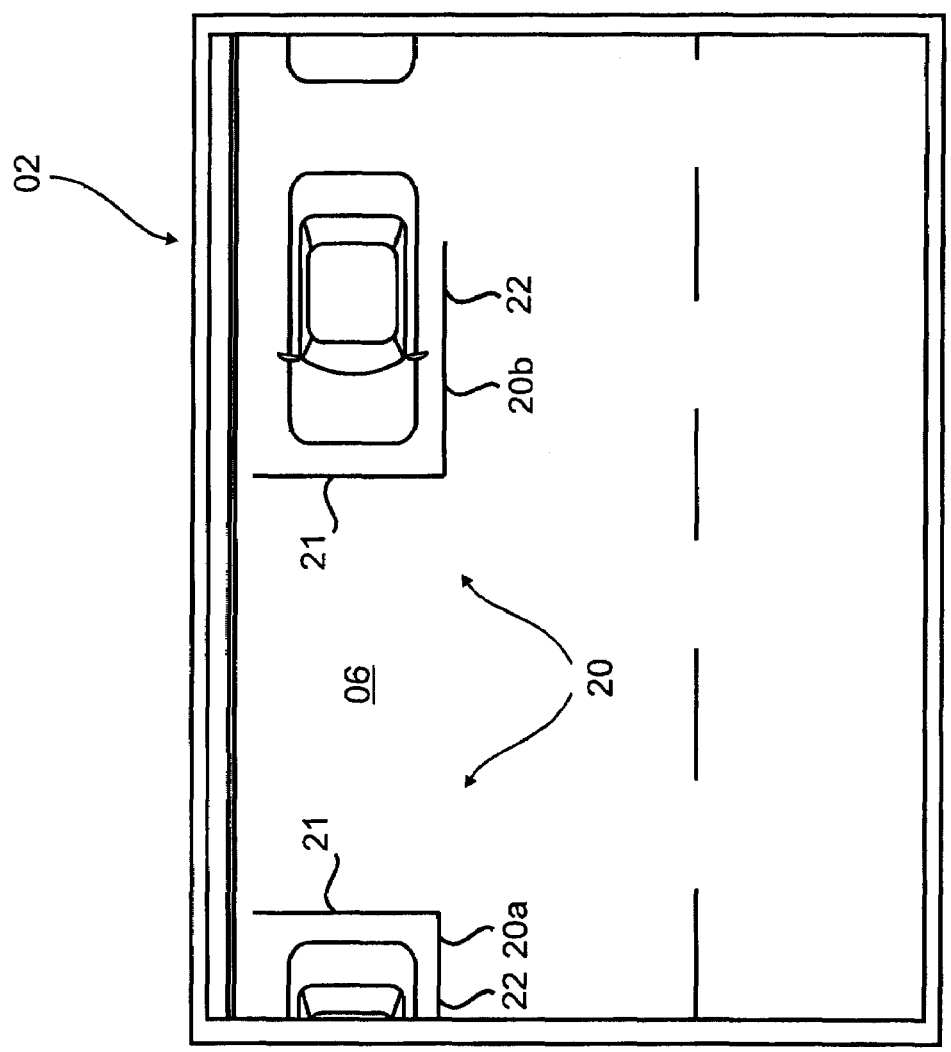
FIG. 8 a third embodiment of a parking place symbol.

FIG. 8 shows a third embodiment 20 of a parking place symbol superimposed on image 07 on display screen 02. The parking place symbol 20 is composed of two paired rectangular symbols 20a and 20b. Each rectangular symbol 20a and 20b has a transverse leg 21 and a longitudinal leg 22, where the distance between the opposing transverse legs 21 corresponds exactly to the length of the road required in parking without a change of directions. The distances across and along the road between the corner of the rectangular symbol 20a and the right-hand corner of the symbol for the vehicle trunk 09 correspond to the distances 10 and 11 according to parking place symbols 08 and 18.

While specific embodiments of the invention have been shown and described in detail to illustrate the application of the principles of the invention, it will be understood that the invention may be embodied otherwise without departing from such principles.

What is claimed is:

1. A method of operating a display system in a vehicle for finding a suitable parking place, the method comprising:
   recording an area of observation in the vicinity of the vehicle with at least one camera;
   processing image data coming from the camera with an image processing unit;
   displaying on a display screen in the interior of the vehicle the image data coming from the image processing unit as a current image showing a potential parking place;
   superimposing a parking place symbol, which symbolizes true to scale an area in the current image which the vehicle may occupy that is generally parallel but offset from a current position of the vehicle or offset at an angle to a current position of the vehicle and which area the vehicle can reach when parking, starting from the current position, taking into account the properties of the vehicle, including the size of the vehicle and the maximum steering angle by the image processing unit onto the current image on the display screen, with the area having dimensions corresponding to the vehicle and displayed true to the scale of the displayed image data; and positioning the car in a suitable starting position for approaching the potential parking place whereby the parking place symbol is moved and brought into complete correspondence with the potential parking place providing a visual indication as to whether the potential parking place is of sufficient size for the vehicle.

2. The method according to claim 1, wherein the parking place symbol is designed in the manner of a rectangular symbol.

3. The method according to claim 2, wherein the length of the rectangle or the distance between the opposing transverse legs corresponds approximately, based on the scale of the image representation, to the length of road necessary for parking without changing directions.

4. The method according to claim 1, wherein the parking place symbol is designed in the manner of two paired rectangular symbols each with one transverse leg and one longitudinal leg.

5. The method according to claim 4, wherein the width of the rectangle or the length of the transverse legs corresponds approximately to the width of the vehicle on the scale of the image representation.

6. The method according to claim 4, wherein the length of the rectangle or the distance between the opposing transverse legs corresponds approximately, based on the scale of the image representation, to the length of road necessary for parking with maneuvering with a predetermined number of changes in direction.

7. The method according to claim 1, wherein the size of the superimposed parking place symbol and/or the arrangement of the superimposed parking place symbol in the image on the display screen can be altered by operating at least one operating element by the driver, in which case at least one of the change in size and change in position of the superimposed parking place symbol is converted to dimensions on the scale of the environment, taking into account the scale of the representation.

8. The method according to claim 1, wherein the image data of several cameras are mixed together in the image processing unit to generate a common image to be displayed on the display screen from the image data.

9. The method according to claim 1, wherein the observation area of the camera is located behind the trunk of the vehicle.

10. The method according to claim 1, wherein the camera is equipped with a wide-angle lens, whereby image distortion caused by the wide-angle lens is at least partially removed by processing the image data in the image processing unit.

11. The method according to claim 1, wherein the image data are processed in the image processing unit such that the image displayed on the display screen corresponds to a perspective outside the vehicle from a top view from above the vehicle.

12. The method according to claim 1, wherein different parking place symbols are stored in the image processing unit and are selected by an operator of the vehicle depending on a current parking situation and are superimposed on the image on the display screen.

13. The method according to claim 12, wherein different parking place symbols are stored for parking situations in parking parallel to the edge of the road on the driver's side and for parking situations in parking parallel to the edge of the road on the passenger's side and for parking situations in parking perpendicular to the edge of the road on the driver's side and for parking situations in parking perpendicular to the edge of the road on the passenger's side and for parking situations in parking obliquely to the edge of the road on the driver's side and/or for parking situations in parking obliquely to the edge of the road on the passenger's side.

14. The method according to claim 1, wherein at least one driving movement symbol in the form of a driving tube, is superimposed on the image, symbolizing an area in the image which the vehicle traverses in parking, starting from its current position, to reach the area symbolized by the parking place symbol, taking into account the properties of the vehicle, including the size of the vehicle and the maximum steering angle.

15. The method according to claim 1, wherein at a starting time a vehicle position is defined as the starting point, whereby starting from the parking situation selected by the operator, steering instructions, in particular steering angle settings, are calculated automatically and announced to the driver, and these instructions must be followed in parking the vehicle starting from the current position in order to reach the area symbolized by the parking place symbol.

16. The method according to claim 15, wherein the steering instructions are calculated dynamically as a function of the current steering settings so that a when there are deviations between the steering instructions and the steering setting, appropriately corrected steering instructions are announced to the driver.

17. The method according to claim 15, wherein the currently required steering instructions are at least one of displayed visually for the driver during the parking operation as the set point steering angle symbol and they are announced acoustically and haptically as a set point steering angle signal.

18. The method according to claim 17, wherein the current actual steering angle is displayed visually for the driver in comparison with the current set point steering angle as the actual steering angle symbol during the parking operation.

19. The method according to claims 1, wherein the currently required steering angle setting is automatically set.

20. A method of operating a display system in a vehicle for finding a suitable parking place, the method comprising:

recording an area of observation in the vicinity of the vehicle with at least one camera;

processing image data coming from the camera with an image processing unit;

displaying on a display screen in the interior of the vehicle the image data coming from the image processing unit as a current image;

superimposing a parking place symbol, which symbolizes true to scale an area in the current image which the vehicle can reach when parking, starting from its current position, taking into account the properties of the vehicle, including the size of the vehicle and the maximum steering angle by the image processing unit onto the current image on the display screen, wherein a vehicle position is specified as the starting point at a starting time, whereby the current image at the starting time is stored temporarily and is displayed permanently on the display screen as the temporarily stored image while the vehicle is moving further starting from the position at the starting time and whereby the movement of the vehicle is detected with a sensor system and is sent as movement data to the image processing unit, and whereby a vehicle symbol is superimposed on the temporarily stored image, the position of this symbol being calculated on the basis of the current movement data, and the current position of the vehicle being symbolized true to scale in the temporarily stored image.

* * * * *